Oct. 13, 1970　　　　　M. J. HARTIG　　　　　3,533,896
ANCHORING DEVICE OF THERMOPLASTIC RESIN
Filed March 27, 1967　　　　　　　　　　　　3 Sheets-Sheet 2

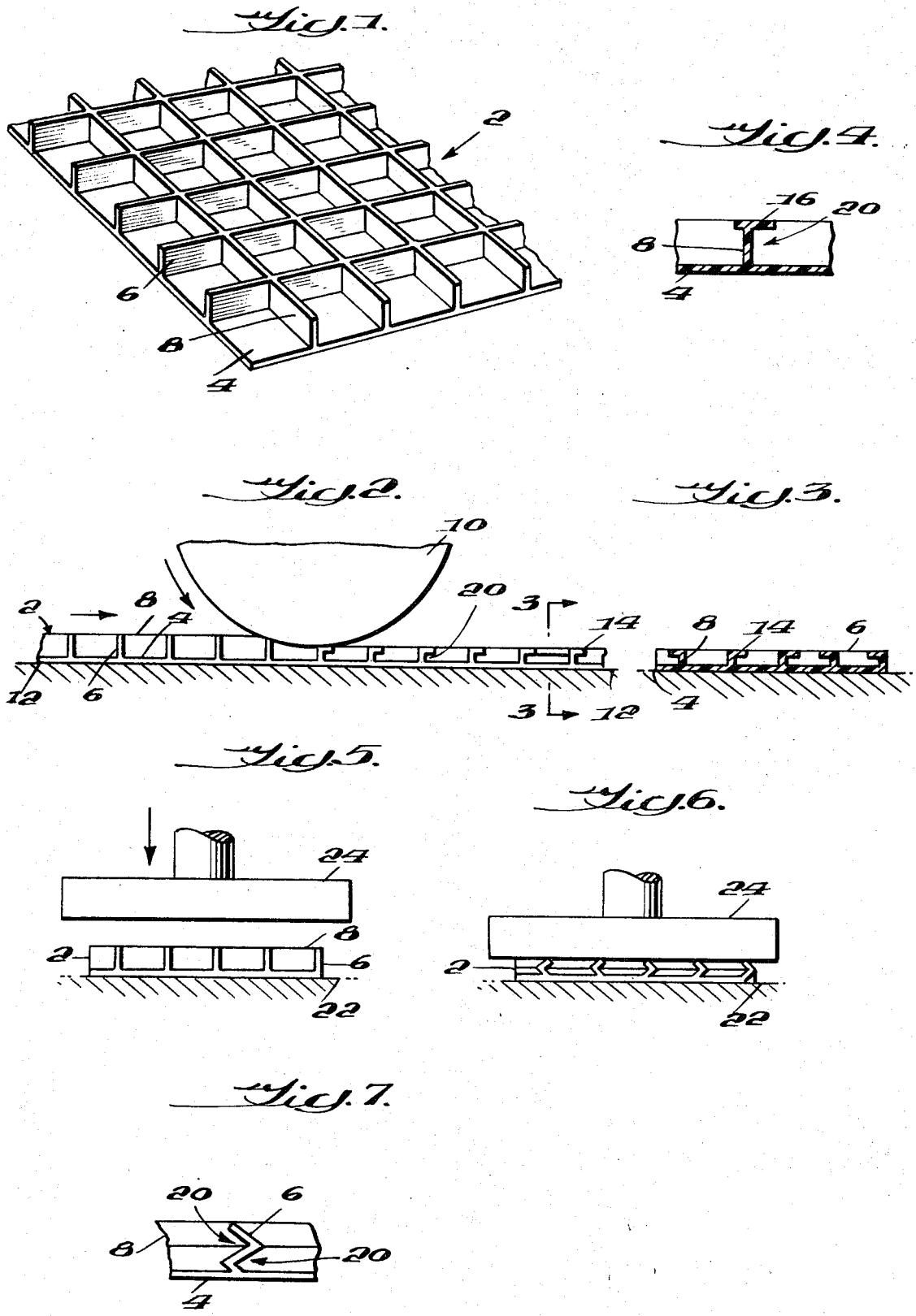

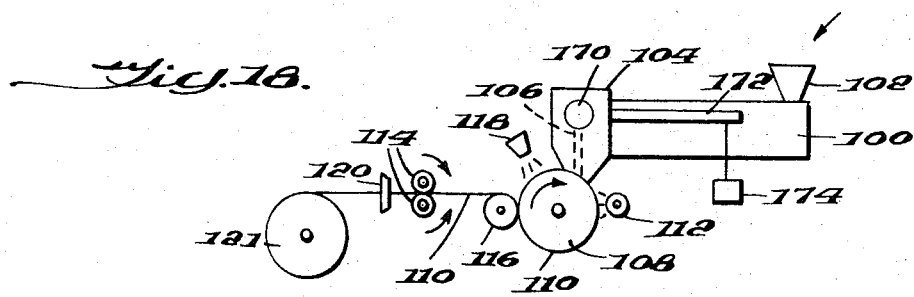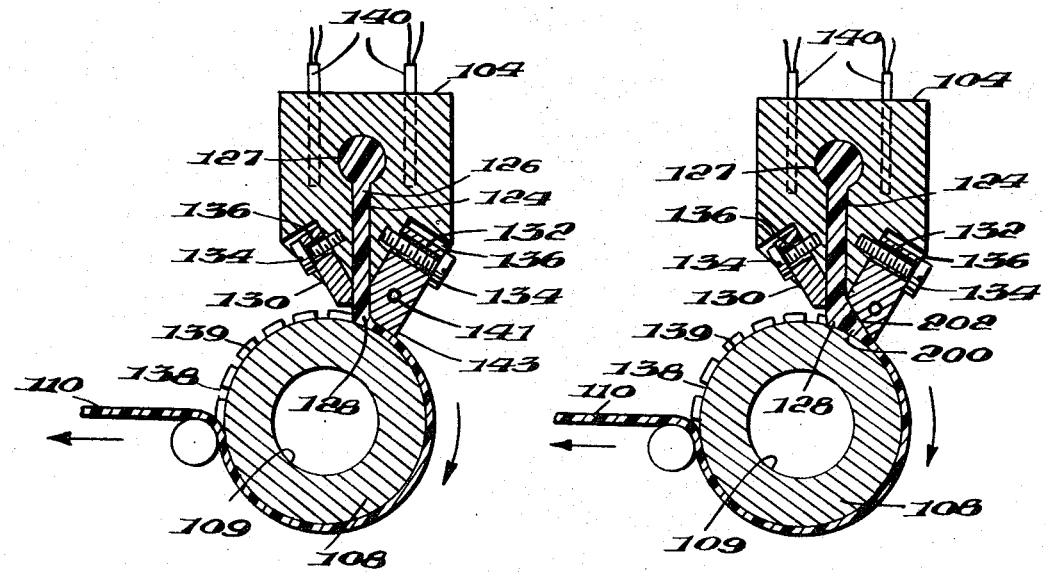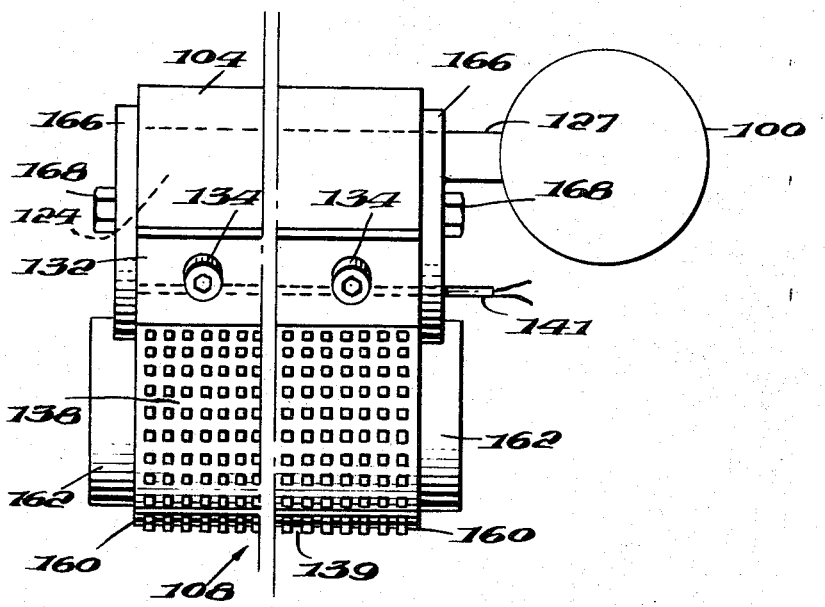

United States Patent Office 3,533,896
Patented Oct. 13, 1970

3,533,896
ANCHORING DEVICE OF THERMOPLASTIC RESIN
Martval J. Hartig, Wilmington, Del., assignor to E. I. du Pont de Nemours and Company, Wilmington, Del., a corporation of Delaware
Filed Mar. 27, 1967, Ser. No. 626,103
Int. Cl. B32b 3/12
U.S. Cl. 161—100                                    1 Claim

ABSTRACT OF THE DISCLOSURE

A structure of thermoplastic resin is provided consisting of a film and ribs integrally molded to the film with the ribs being deformed towards the film or being secured to an apertured film so as to form reentrant cavities therewith so that when these ribs are embedded in a moldable, settable material such as plaster, the structure becomes anchored thereto on setting of the plaster.

---

This invention relates to a light-weight, mass-producable plastic device for anchoring in moldable, settable material.

The anchoring device of this invention comprises a film of thermoplastic resin and a plurality of ribs, preferably in a network pattern, of thermoplastic resin extending coextensively with the film and integrally molded to the film with the ribs being deformed toward the film so as to form reentrant cavities or pockets with the film. The device achieves its anchoring result by embedding of its so-deformed ribs into moldable, settable material which flows into the reentrant cavities or pockets and which upon hardening prevents withdrawal of the ribs from the settable material, with the film of the device being retained substantially coextensive with the surface of the moldable, settable material.

In another embodiment, an apertured film is secured to the tops of the ribs which are in undeformed condition, with closed portions of the film overlying portions of the film of the ribbed structure to form reentrant cavities therewith.

These and other embodiments of the present invention will be more fuly discussed hereinafter with respect to the accompanying drawings in which:

FIG. 1 shows an enlarged perspective view of a portion of a web of ribbed structure from which anchoring devices of the present invention can be made;

FIG. 2 shows diagrammatically in side elevation a method for deforming the ribs of the ribbed structure of FIG. 1 to form one embodiment of anchoring device of this invention;

FIG. 3 shows a section of anchoring device taken along line 3—3 of FIG. 2;

FIG. 4 shows an enlarged cross-section of another embodiment of a deformed rib for use in anchoring devices of this invention;

FIG. 5 shows diagrammatically a side elevation of another embodiment for deforming ribs of the ribbed structure of claim 1;

FIG. 6 shows the ram of FIG. 5 deforming the ribs of the ribbed structure thereof;

FIG. 7 shows an enlarged view of a deformed rib obtainable by the embodiment of FIGS. 5 and 6;

FIG. 18 shows in diagrammatic side elevation apparatus for making a continuous web of ribbed structure;

FIG. 19 shows in cross-section one embodiment of molding apparatus for use in the apparatus of FIG. 18;

FIG. 20 shows in cross-section another embodiment of apparatus for use in the apparatus of FIG. 18; and FIG. 21 shows an embodiment for laterally confining molten thermoplastic resin in an embodiment of roll pattern for making a continuous web of ribbed structure.

Figure 8:
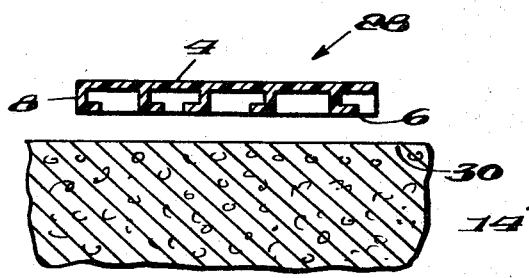
FIG. 8 shows in schematic side cross-section the positioning of an anchoring device of the present invention with respect to moldable, settable material.
Figure 9:
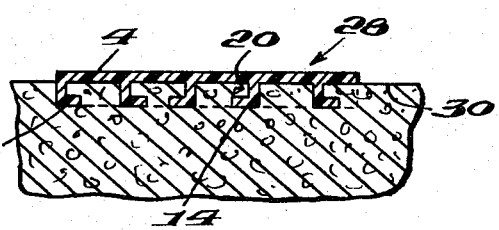
FIG. 9 shows the anchoring device of FIG. 8 in anchored relationship in the moldable settable material of FIG. 8.

Referring now to the drawings, FIG. 1 shows a web of ribbed structure 2 of thermoplastic resin from which anchoring devices of the present invention can be made. The ribbed structure 2 consists of a continuous film 4 forming one surface of the structure and molded integrally therewith a network, i.e., intersecting, of ribs consisting of ribs 6 and 8 to form a pattern of squares between the ribs. The intersections of the ribs 6 and 8 are also integrally molded. The network of ribs and the film 4 are coextensive with one another.

Generally, the ribs are spaced as far apart as posible to obtain low bulk densities for economy purposes. Bulk densities for the network of ribs and for the ribbed structure can be less than 20 percent and 30 percent respectively, and preferably less than 12 percent and 20 percent respectively, of the density of the thermoplastic resin from which the structure is made. However, higher bulk density structures are applicable in the present invention. Representative dimensions for ribbed structures are as follows, all dimensions being in inches:

| Width of ribs | Height of ribs | Spacing between ribs | Film thickness |
|---|---|---|---|
| 0.004 | 0.025 | 0.073 | 0.0017 |
| 0.005 | 0.038 | 0.107 | 0.0025 |
| 0.005 | 0.035 | 0.170 | 0.010 |
| 0.006 | 0.056 | 0.150 | 0.0035 |
| 0.007 | 9.072 | 0.170 | 0.0040 |
| 0.010 | 0.050 | 0.200 | 0.015 |

The ribbed structure of FIG. 1 can be made into an anchoring device of the present invention by deforming its ribs in the direction towards the film 4 of the ribbed structure so that instead of the ribs forming straight 90° angles with the film, the ribs 6 and 8 form reentrant cavities or pockets with the ribs. A method for carrying out this deformation is shown in FIG. 2 wherein the ribbed structure of FIG. 1 is passed between the nip of a rotating roll 10 and a stationary surface 12, with the nip being smaller than the thickness of the ribbed structure 2. Thus, as the ribbed structure passes through the nip a crushing action on the tops of the ribs 6 and 8 occur. In this embodiment, roll 10 is heated to a temperature close to the melting point of the thermoplastic resin of which the ribbed structure 2 is composed so that the deformation takes the form of flanges 14 at the tops of the ribs 6 and 8.

This deformation can occur so that the flanges 14 can be facing in either direction, particularly for ribs 8 which are parallel to the direction of movement of the ribbed structure, such as shown in FIG. 3. By controlling the relative motion between the roll 10 and ribbed structure 2, a smearing action on the tops of the ribs might be produced, to produce a flange 16 and pockets 20 which extend in both directions from the ribs such as rib 8 as shown in FIG. 4.

The direction of the flanges 14 or 16 with respect to the ribs 6 or 8 is relatively unimportant so long as such flanges or their like are produced whereby reentrant cavities or pockets 20 are formed between the flanges and the continuous film 4 of the ribbed structure.

The deformation of the ribs 6 and 8 are of the ribbed structure may also be accomplished by crushing, such as between a fixed surface 22 and a downwardly movable ram 24, in which case the ram is at room or slightly elevated temperature. This pressure causes the ribs to be crushed somewhat so that the ribs are in an irregular bent or folded pattern, such as shown in FIG. 6. As shown in FIG. 7, the so-crushed rib may take form of multiple-folds to produce a plurality of reentrant cavities or pockets 20. The degree of crush in this embodiment of deforming the ribs 6 and 8 is carried out sufficiently so that upon release of the pressure by ram 24 the spring-back of the ribs does not destroy the cavities 20.

The ram 24 can be heated to a higher temperature to form the more regular flange formation as obtained for the embodiment of FIG. 2. Conversely, the roll 10 of FIG. 2 can be employed at lower temperatures to give the somewhat irregular crush pattern for the ribs as obtained for the embodiments of FIGS. 5 and 6. Generally, the height of the deformed ribs will be from 20 to 70% of the original height of the ribs.

In us, an anchoring device 28 of this invention, resembling that of FIG. 3, is superimposed before the surface of a material 30 which is moldable and thereafter settable, as shown in FIG. 8. The anchoring device is pressed into the surface of the material 30 whereby ribs 6 and 8 and flanges 14 thereof become embedded in the material 30, with the film 4 lying coextensive with the surface thereof. By virtue of the moldability of the material 30, the deformed ribs 6 and 8 are permitted to penetrate the material 30, and the material 30 flows into the cavities 20 to cause the filling thereof. Upon standing, the material 30 sets, i.e., hardens, with the flanges 14 of the ribs 6 and 8 preventing withdrawal of the anchoring device from the material 30. Regardless of the degree of bond between the thermoplastic resin of which the anchoring device is made and the set material 30, the anchoring device is firmly secured in the material 30 by the mechanical interlock between the flanges 14 and material 30 contained in cavities 20.

Figure 10:
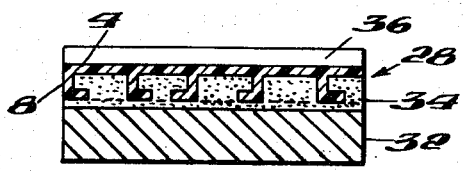
FIG. 10 shows another embodiment of moldable, settable material with the anchoring device of FIG. 8 anchored therein.

Any material which is moldable to the extent permitting penetration of the flanged ribs of the anchoring device of this invention and will flow into the cavities created by these flanged ribs and film of the anchoring device, and then which will harden, can be used as the moldable, settable material 30 for which the anchoring device of this invention is useful, the moldable, settable material can be, for example, plaster, concrete or asphalt. Alternatively, it may be desired to fasten the anchoring device to a material which is already in the set or hardened condition such as metallic material 32 shown in FIG. 10. In this instance, the material is coated with an adhesive 34 into which the anchoring device of this invention is then embedded. The hardening of the adhesive 34 serves to secure the anchoring device to the material 32. The anchoring device can be used on both sides of the moldable, settable material, e.g., when the material is in the form of a wall.

The anchoring device of the present invention may serve as a substrate for a facing material 36 which can be applied to the exposed film 4 of the anchoring device before or after its embedding in the moldable, settable material. The particular facing material 36 employed will depend on the application involved. For example, the facing material can be highway-lane marking paint, in which case the anchoring device would be embedded directly in the concrete or asphalt road surface. The facing material may also be of a decorative wood or tile material, or another plastic material. The film of the anchoring device with or without suitable waterproof facing material can be used to form a waterproof surface for concrete.

Figure 11:
FIG. 11 shows in cross-section a side elevation of another embodiment of anchoring device of this invention.
Figure 12:
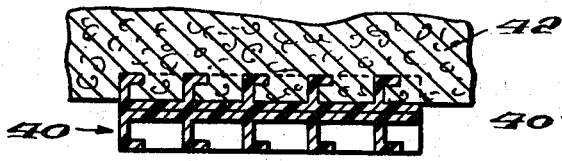
FIG. 12 shows in cross-section a side elevation of the anchoring device of FIG. 11 embedded in a first moldable settable material.
Figure 13:
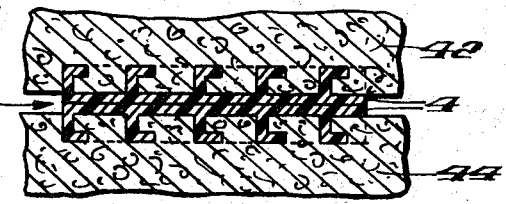
FIG. 13 shows in cross-section a side elevation of first and second moldable settable materials secured together by the anchoring device of FIG. 11.
Figure 14:
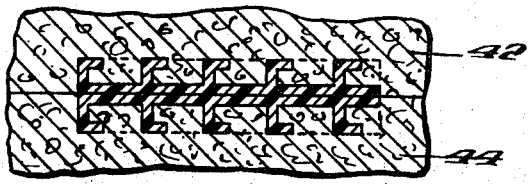
FIG. 14 shows in cross-section a side elevation of another securement arrangement for the embodiment of FIG. 13.

In another embodiment of the present invention two sections of anchoring device can be laminated to one another, either by gluing or by melt-bonding film to film to form a transition piece 40 as shown in FIG. 11. This transition piece is useful for bonding two moldable, settable materials to one another, for example, by first embedding one surface of the transition piece in a first moldable, settable material 42 as shown in FIG. 12. After the material 42 has set or during its setting, the opposite surface of the transition piece 40 is embedded into a second moldable, settable material 44, as shown in FIG. 13. Upon hardening of both materials 42 and 44, they become secured to one another, spaced apart just about the sum of the thickness of the films 4 of each anchoring device of the transition piece. Alternatively, the materials 42 and 44 can be secured together in contiguous relationship by causing the films 4 of the anchoring devices to be embedded in their respective moldable, settable material, as shown in FIG. 14.

In another embodiment of anchoring device of this invention, the starting ribbed srtucture can consist of a film, e.g., film 4 and non-intersecting ribs, e.g., ribs 8, only. The methods for deforming such ribs to an anchoring device of this invention are similar to those hereinbefore described, with the added requirement for support for the lower part of the ribs (closest to the film) during deformation, being present. This support can be accomplished by fingers extending along the film and against the lower part of the ribs to act somewhat as an anvil for the top part of the ribs to be deformed thereover. In this embodiment and the previous embodiment in which the ribs are in a network or intersecting pattern in the starting ribbed structure, there can be discontinuities present in the ribs so that the ribs appear as a series of discontinuous projections rather than continuous ribs. Thus, the ribs can appear as a pattern of isolated cruciform shapes 46, one of which is shown integrally molded to a film 4 in FIG. 15, or of single bosses 48, one of which is shown integrally molded to a film 4 in FIG. 16. Such discontinuous projections can be supported by anvil-acting fingers as hereinbefore described for deformation to form reentrant cavities and thus an anchoring device of this invention.

Figure 17:
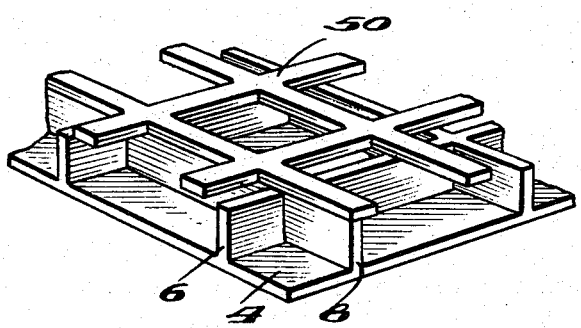
FIG. 17 shows an enlarged perspective view of another embodiment of anchoring device of this invention.

Anchoring devices of this invention can also be made from the ribbed structure hereinbefore representatively described without deformation of the ribs to form pockets. This is attained, e.g., by the securement of an apertured web, such as film 50 of thermoplastic resin, to the tops of ribs, such as ribs 6 and 8 as shown in FIG. 17, or to the ribs 46 or 48. This securement can be done before or after the apertures are formed, by perforation or other means, by conventional adhesives or by heat softening the tops of the ribs and bringing the film 50 into contact therewith. This film can be of a material other than thermoplastic resin, e.g. wood or paper.

Apparatus for continuously molding ribbed srtucture such as of FIG. 1 is shown in FIG. 18. In this figure, an extruder 100 is equipped with a hopper 102 for receiving thermoplastic resin and melting it under pressure. A die 104 receives the pressurized molten resin through its rear (hidden) side from the extruder and passes the resin along a path 106 which terminates in an outlet in pressure-seal relation with a rotating patterned roll 108 and directs the resin substantially free of pressure drop and in the absence of air into the pattern of the roll. The roll 108 continuously moves the molten resin away from the outlet of path 106, thereby forming a continuous molded web 110 having a pattern which is complementary to that of the roll. The web 110 is chilled by a flume or water spray 112, and after sufficient contact with the roll 108 which is internally cooled, the cooled web is removed from the roll by take-off rolls 114 aided by a stripper roll 116 and, optionally, mold release agent applied by spray nozzles 118 to the surface of the roll prior to passage under die 104. Longitudinal dividing or trimming of web 110 is accomplished, if desired, by one or more blades 120 positioned between the take-off rolls 114 and reel 121.

To further describe the die 104 and patterned roll 108, which comprise the molding apparatus, FIG. 19 shows one embodiment in which die 104 contains a cavity 124 serving as path 106 (FIG. 18) and which is supplied with molten thermoplastic resin 126 through inlet pipe 127 by extruder 100 (FIG. 18). Cavity 124 terminates in a slot-shaped outlet 128 extending across the surface of roll 108. The rearward and forward edges of outlet 128 are defined by a die plate 130 and a doctor blade 132, each adjustably spaced from roll 108 and secured to die 104 by bolts 134 extending through slots 136. The pressure upon the molten resin 126 in the cavity forces the resin through outlet 128 and into the roll pattern represented by transverse grooves 138 (enlarged in spacing and width for clarity) and circumferential intersecting grooves 139. The cavity 124 and outlet 128 are substantially free of constriction so that the pressure on the resin at the surface of roll 108 is substantially the same as the pressure on the resin in cavity 124.

The grooves 138 and 139 mold one surface of the web 110. The opposite surface of the web is formed by doctor blade 132 which is adjustably spaced from roll 108 to give the web thickness desired. Die 104 is heated to a temperature above the resin melting temperature of the particular resin being used, by electrical heating elements 140 extending into corresponding wells in the die. The resin melting temperature is the minimum temperature at which a fresh sample of resin leaves a molten trail as it is moved slowly across a heated metal surface. This is also sometimes called the stick temperature.

Doctor blade 132 is heated by an electrical heating element 141 usually to a temperature which is equal to or greater than the temperature maintained by die 104. The outer face 143 of the doctor blade departs sharply from the path of web 110 so as to avoid sticking of the web to the hot doctor blade. Roll 108 is cooled to a temperature which is at least about 10° C. less than the melting temperature of the resin being molded, such as by passing a cooling medium through an interior passage 109.

In FIG. 20 essentially the same equipment arrangement as in FIG. 19 is used except that slot-shaped outlet 128 includes a wedge-shaped passage 200 extending in the direction of rotation of roll 108. The wedge-shaped of the passage 200 is formed by doctor blade 132 having a slant surface 202 facing the roll 108. Movement of the surface of roll 108 past the opening 128 drags molten resin into the passage 200 wherein the flowing resin is forced into the pattern on roll 108. This drag flow pressure created in the passage 200 at the surface of the roll augments the pressure on the resin within cavity 124 of the die.

The molding apparatus of FIGS. 19 and 20 can be provided with water spray 112 and mold release spray nozzles 118 as shown in FIG. 18.

A pressure-seal relation between the outlet 128 for the molten thermoplastic resin and roll 108 is maintained so that the pressure on the resin in cavity 124 and the drag flow pressure, when the apparatus of FIG. 20 is employed, are available to force the resin into the pattern of roll 108 on a continuous and high speed of production basis. The pressure-seal relation is obtained, in part, by adjusting the doctor blade 132 to constrict the flow space for the resin as it leaves outlet 128 and by having a sufficient rate of web formation for the viscosity of the particular resin being molded to prevent back flow under the die plate 130 which is generally spaced 2 to 10 mils from the surface of roll 108.

FIG. 21 shows, in indeterminate width, means for laterally confining the molten thermoplastic resin as it leaves opening 128 so as to complete the pressure-seal relation. In FIG. 21, the doctor blade 132 is shown in operative position and provided with heating element 141. The lateral surface of the roll 108 is provided with a pattern shown in enlargement and consisting of transverse grooves 138 and circumferential grooves 139 (both enlarged for clarity), terminating at shoulders 160 formed between the surface of the roll and cylindrical ends 162 of reduced diameter extending from each end of the roll. The molten resin from cavity 124 is molded into a web which extends entirely across the roll pattern. Further sideways flow of the resin, however, is prevented by a pair of end plates 166 adjustably spaced from roll 108 by bolts 168 passing through slots (not shown) in the end plates and tightened into die 104. The end plates 166 each lie close to the shoulders 160 and have a lower arcuate surface lying close to the corresponding surface of cylindrical ends 162. This close spacing, on the order of several mils, permits a small amount of molten resin to enter the tortuous path around shoulders 160 before chilling of the resin occurs. This chilling prevents sideways leakage of additional resin and loss of molding pressure. A low friction pressure sealing system, without the need for metal-to-metal contact or necessity for further lubrication, is provided by this small amount of resin entering between end plates 166 and roll 108. The end plates 166 also form the lateral sides for cavity 124 and the die outlet 128 which is coextensive therewith.

Means can also be provided for changing the spacing between the die 104 and the roll 108 to compensate for pressure fluctuations caused by extruder 100 so as to maintain a constant force on the resin entering the roll pattern. Exemplary of such means is the pivotal mounting of die 104 about a stub shaft 170 which is on center with the feed line between extruder 100 and the die, and providing a lever arm 172 having the desired weight 174 suspended therefrom as shown in FIG. 18. Excessive molding pressure is relieved by the die 104 rotating away from roll 108. Upon return of the pressure to normal, weight 174 restores the die 104 to its former position to produce web of the desired thickness.

To fill rib patterns in the surface of the roll rotating at a given speed, not only must the pressure on the resin and its volume be sufficient, but the pressure must also be supplied for sufficient duration to cause the resin to flow into the pattern. To accomplish this, it is preferred, where possible depending on the pattern, to have the width of outlet 128 in the direction of rotation of roll 108 greater than at least one repeat unit in the pattern.

In operation, the roll 108 is rotated and molten thermoplastic resin is forced into the pattern of the roll. Molten resin which is contiguous with the surface of the roll and molten resin within the rib pattern is formed into a film, corresponding to film 4, by doctor blade 132. The resin is cooled and removed from the roll as a continuous, integrally molded patterned web, with the rib pattern being complementary to that of the pattern in the roll 108 and consisting of a plurality of longitudinally extending ribs (ribs 8) corresponding to grooves 139 and transversely extending ribs (ribs 6) corresponding to grooves 138.

Figure 15:
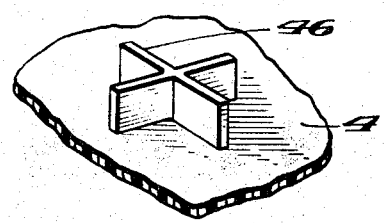
FIG. 15 shows an enlarged perspective view of another embodiment of ribbed structure from which anchoring devices of this invention can be made.
Figure 16:
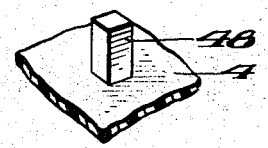
FIG. 16 shows an enlarged perspective view of still another embodiment of ribbed structure from which anchoring devices of this invention can be made.

The roll pattern can be varied to form ribbed structure in which the network of ribs is in the form of different intersecting polygonal patterns such as rectangles, triangles, or hexagons, or of curvilinear patterns, such as circles instead of the pattern of squares shown in FIG. 1. By omission of grooves 138 from the roll, the ribbed structure having non-intersecting ribs running in one direction only is produced. By having the grooves 138 and/or 139 runnng discontinuously, patterns such as shown in FIGS. 15 and 16 are produced. Subsequent inward deformation of ribs in these patterns or securement of these ribs to an apertured web will produce the anchoring result obtained for the ribbed structure of FIG. 1. The web 110 can be longitudinally trimmed to form a single wide ribbed structure of a plurality of narrower ribbed structures and is transversely severed to define the length of the ribbed structure desired.

Details illustrating the manufacture of web of ribbed structure such as web 110 are as follows: the patterned roll has a pattern in its surface consisting of grooves 0.010 inch wide x 0.050 inch deep running parallel to and perpendicular to the direction of rotation of the roll to form squares measuring about ⅛ inch on a side. The roll is maintained at a temperature of about 80° C. and is rotated at a surface speed of about 20 ft./min. Polyethylene having a melt index of 0.70 and density of 0.967 g./cc. is forced at 275° C. and at a pressure of about 250 p.s.i.g. into the pattern of the roll from a pivotally mounted die having its outlet 128 and doctor blade 132 maintained about 0.004 inch from the roll during operation by a weight acting through a 30 inch lever arm. No mold release agent is used. The resultant web consists of continuous film measuring 0.010 inch wide x 0.050 inch deep.

A ribbed structure is made in the same equipment but from 66 nylon instead of polyethylene, by operating the patterned roll at 150° C. and a molding temperature of 270° C. and pressure of 100 p.s.i.g.

An anchoring device is made from the polyethylene ribbed structure prepared as in the foregoing paragraph by hot pressing with a ram heated to 150° C. for 2 to 3 seconds to form a rib height of about 0.022 inch topped off by a flange extending about 0.017 inch from rib to flange tip.

The thermoplastic resins which are useful in making anchoring devices of the present invention are any of which are extrudable into continuous solid shapes from a heated, molten condition and under relatively high pressures. Examples of suitable thermoplastic resins include polystyrene, high impact polystyrene, ABS resin, the saturated hydrocarbon polymers, such as polyethylene, linear or branched, polypropylene and copolymers thereof; ionomers such as described in Canadian Pats. 674,595 and 713,631 both to R. W. Rees; copolymers of ethylene with an α,β-unsaturated carboxylic acid such as described in British Pat. 963,380 to Du Pont, and blends thereof with saturated hydrocarbon polymers and such blends containing co-crystallized oxide water activated crosslinking agents such as described in U.S. patent application Ser. No. 248,229, filed Dec. 31, 1962, by Halliwell et al.; halogenated or perhalogenated olefins, such as vinyl chloride polymer and melt fabricable tetrafluoroethylene polymers such as copolymers thereof with hexafluoropropylene, and chlorotrifluorthylene polymer; polyvinyl acetate and copolymers thereof with saturated hydrocarbon polymers and optionally, the acid copolymers of British Pat. 963,380 to Du Pont; polymers of α,β-unsaturated carboylic acid, such as polymethylmethacrylate; the polyamides such as polyhexamethylene adipamide (66 nylon), polyexamethylene sebacamide (610 nylon), polycaprolactam (6 nylon), copolymers thereof and blends of the polyamides with acid copolymers, ionomers and/or saturated hydrocarbon polymers; polyoxymethylene polymer and copolymer; polycarbonate; polyethylene terephthalate.

The particular molding temperatures employed in making ribbed structures for use in making anchoring devices will depend upon such operating conditions as the speed of the patterned roll 108 and the intricacy of the pattern therein. Typical molding temperatures for some of the thermoplastic resins suitable for use in the present invention are as follows: linear polyethylene 200–250° C.; branched polyethylene 180–190° C.; polypropylene 200–250° C.; polystyrene 240–280° C.; polyvinyl chloride 150–170° C.; and 66 nylon 260–350° C. Generally deformation of the ribs of ribbed structure to form anchor devices of this invention will be carried out with a pressing surface (ram or roll) heated to within about 20° C. of the stick temperature of the particular resin.

The wedge-shaped passage 200 can be of any configuration which augments the molding pressure supplied by the extruder. Generally, the passage 200 will take the form of converging surfaces, with the roll pattern forming one of these surfaces. The pressures required on molten thermoplastic resin in cavity 124 can be less than the full extrusion pressure of the extruder, depending upon which resin is employed and upon operating conditions. The pressure in the cavity 124, however, is substantially the same as the pressure on the resin coming into contact with the pattern of the roll surface. When such pressure is insufficient, the drag flow arrangement of FIG. 20 can be used to increase the force present for continuously filling the pattern with molten resin.

As many apparently widely different embodiments of this invention may be made without departing from the spirit and scope thereof, it is to be understood that this invention is not limited to the specific embodiments thereof except as defined in the appended claim.

What is claimed is:
1. In a film surfacing member for moldable material capable of being set, comprising a film surfacing component of theroplastic resin having ribs integrally molded therewith, said ribs provided for inserting in the moldable material, the improvement comprising defining reentrant cavities by (a) a second film component which is apertured, the second film component being comprised of a thermoplastic material and being secured to the tops of the ribs of said first film component, and (b) said ribs and film surfacing component.

References Cited

UNITED STATES PATENTS

| 2,573,482 | 10/1951 | Peik | 161—53 X |
| 2,816,323 | 12/1957 | Munger | 264—274 X |
| 2,836,528 | 5/1958 | Ford | 161—231 X |
| 3,043,730 | 7/1962 | Adie | 161—68 X |
| 3,338,014 | 8/1967 | Waite | 52—309 |

FOREIGN PATENTS

| 13,055 | 6/1905 | Great Britain. |

JOHN T. GOOLKASIAN, Primary Examiner

J. C. GIL, Assistant Examiner

U.S. Cl. X.R.

52—390; 161—69, 99, 161; 264—274